United States Patent [19]

Kudo

[11] Patent Number: 5,198,808
[45] Date of Patent: Mar. 30, 1993

[54] MATRIX SWITCH APPARATUS WITH A DIAGNOSIS CIRCUIT HAVING STAND-BY PORTS AND REDUCED SIZE MATRIX SWITCHING ELEMENTS

[75] Inventor: Hirotsugu Kudo, Tokyo, Japan
[73] Assignee: NEC Corporation, Tokyo, Japan
[21] Appl. No.: 799,897
[22] Filed: Dec. 2, 1991

Related U.S. Application Data

[63] Continuation of Ser. No. 409,403, Sep. 19, 1989, abandoned.

[30] Foreign Application Priority Data

Sep. 20, 1988 [JP] Japan .................. 63-233685

[51] Int. Cl.[5] .................. H04Q 1/00; H04Q 11/04
[52] U.S. Cl. .................. 340/825.8; 340/825.01;
340/825.79; 340/827; 370/16; 370/60; 379/17;
379/291; 379/335
[58] Field of Search .................. 340/825.79, 825.80,
340/825.89, 825.01, 827; 370/14, 16, 58.1, 59,
63, 60; 379/12, 16, 17, 220, 290, 291, 306, 335;
371/8.1, 24

[56] References Cited

U.S. PATENT DOCUMENTS

| | | | |
|---|---|---|---|
| 3,582,560 | 6/1971 | Banks .................. | 340/825.8 |
| 4,266,293 | 5/1981 | Anderson et al. .................. | 370/14 |
| 4,400,627 | 8/1983 | Zola .................. | 340/825.80 |
| 4,535,442 | 8/1985 | Maddern .................. | 370/60 |
| 4,654,842 | 3/1987 | Coraluppi et al. .................. | 340/825.8 |
| 4,700,348 | 10/1987 | Ise et al. .................. | 340/825.01 |
| 4,782,478 | 11/1988 | Day .................. | 370/60 |
| 4,811,333 | 3/1989 | Rees .................. | 340/825.8 |
| 4,970,505 | 12/1990 | Hirata .................. | 340/825.80 |
| 5,072,440 | 12/1991 | Isono .................. | 340/827 |
| 5,153,578 | 10/1992 | Izawa .................. | 340/827 |

FOREIGN PATENT DOCUMENTS

| | | | |
|---|---|---|---|
| 0136452 | 7/1985 | Japan .................. | 371/8.1 |
| 0078695 | 4/1988 | Japan .................. | 379/12 |

*Primary Examiner*—Donald J. Yusko
*Assistant Examiner*—Brian Zimmerman
*Attorney, Agent, or Firm*—Foley & Lardner

[57] ABSTRACT

In a matrix switch apparatus with a diagnosis circuit, a switch unit is positioned between a group of input line interface circuits and a group of output line interface circuits. The switch unit includes front switches and back switches, respectively, equal in number to the input and output line interface circuits, and middle switches of 2M in number. The number M is the number of interface elements included in each of the input and output line interface circuits. Each of the front and back switches is provided with input and output ports having a ratio, respectively, determined by (M+1) and 2M, and each of the middle switches is provided with input and output ports, respectively, equal in number to 2M. In accordance with the above structure, the diagnosis of a stand-by port connected to a stand-by interface element included in each of the input and output line interface circuits can be carried out, even if all working input and output ports connected to the interface elements are occupied for operation.

4 Claims, 5 Drawing Sheets

MATRIX SWITCH APPARATUS WITH A DIAGNOSIS CIRCUIT HAVING STAND-BY PORTS AND REDUCED SIZE MATRIX SWITCHING ELEMENTS

This application is a continuation of application Ser. No. 07/409,403, filed Sep. 19, 1989, now abandoned.

FIELD OF THE INVENTION

This invention relates to a matrix switch apparatus with a diagnosis circuit and, more particularly, to a matrix switch apparatus in which the diagnosis of stand-by ports is carried out.

BACKGROUND OF THE INVENTION

A matrix switch apparatus in which a redundancy structure is applied to line interface circuits has been proposed in the U.S. Ser. No. 235,442 filed on Aug. 23, 1988, now abandoned. The matrix switch apparatus comprises a predetermined number of input line interface circuits, a predetermined number of output line interface circuits, and a predetermined number of switch units each positioned between the input and output line interface circuits to be connected thereto. Each of the input and output line interface circuits includes a stand-by interface element and plural interface elements, and each of the switch units includes front, middle and back switches.

In operation, an input signal supplied to an input port of an interface element in one of the input line interface circuits is supplied to one of the front switches in one of the switch units. In the switch unit, the supplied signal is transmitted from the front switch through connected middle and back switches to a predetermined interface element in one of the output line interface circuits. Thus, an output signal is obtained at an output port of the predetermined interface element by the change-over of a connecting path in the front, middle and back switches of the switch unit.

In the matrix switch apparatus, if one of the interface elements in one of the input line interface circuits breaks down, an input port of the broken interface element is switched to be connected to the stand-by interface element, thereby avoiding the suspension of operation. On the other hand, if one of the switch units breaks down, the remaining one of the switch units is selected to operate, thereby also avoiding the suspension of operation. This stand-by mode operation can be carried out in accordance with the redundancy structure including the stand-by interface element in each of the input and output line interface circuits and the provision of the plural switch units. This matrix switch apparatus will be explained in more detail later.

However, the matrix switch apparatus has a disadvantage in that the diagnosis of stand-by ports can not be carried out, where all input ports of the interface elements are occupied for operation, since a connecting path communicating to the stand-by ports is not realized in the switch unit including the front, middle and back switches due to the fact that the scale of each switch unit is small.

SUMMARY OF THE INVENTION

Accordingly, it is an object of the invention to provide a matrix switch apparatus with a diagnosis circuit in which the diagnosis of stand-by ports can be carried out, even if all input ports are occupied for operation.

It is a further object of the invention to provide a matrix switch apparatus with a diagnosis circuit in which the scale of a switch unit including front, middle and back switches does not become unduly large even though the diagnosis of stand-by ports is performed in any state.

According to the invention, a matrix switch apparatus with a diagnosis circuit comprises, a predetermined number of input line interface circuits each including a stand-by interface element and interface elements of M in number to provide a 1:M redundancy structure, where M is an integer;

said predetermined number of output line interface circuits each including a stand-by interface element and interface elements of M in number to provide a 1:M redundancy structure;

a switch unit including front switches, middle switches, and back switches, respectively, arranged in rows to be positioned between said input line interface circuits and said output line interface circuits;

a diagnosis circuit for supplying a diagnosis signal to said stand-by interface elements in said input line interface circuits and receiving said diagnosis signal from said stand-by interface elements in said output line interface circuits to diagnose input and output stand-by ports;

wherein the number of said front and back switches is equal to said predetermined number, respectively, each of said front and back switches is provided with input and output ports having a ratio defined by (M+1) and 2M, and the number of said middle switches is 2M, each of said middle switches being provided with input and output ports, respectively, equal in number to 2M.

BRIEF DESCRIPTION OF THE DRAWINGS

The invention will be described in more detail in conjunction with appended drawings, wherein.

DESCRIPTION OF THE PREFERRED EMBODIMENT

Figure 1:
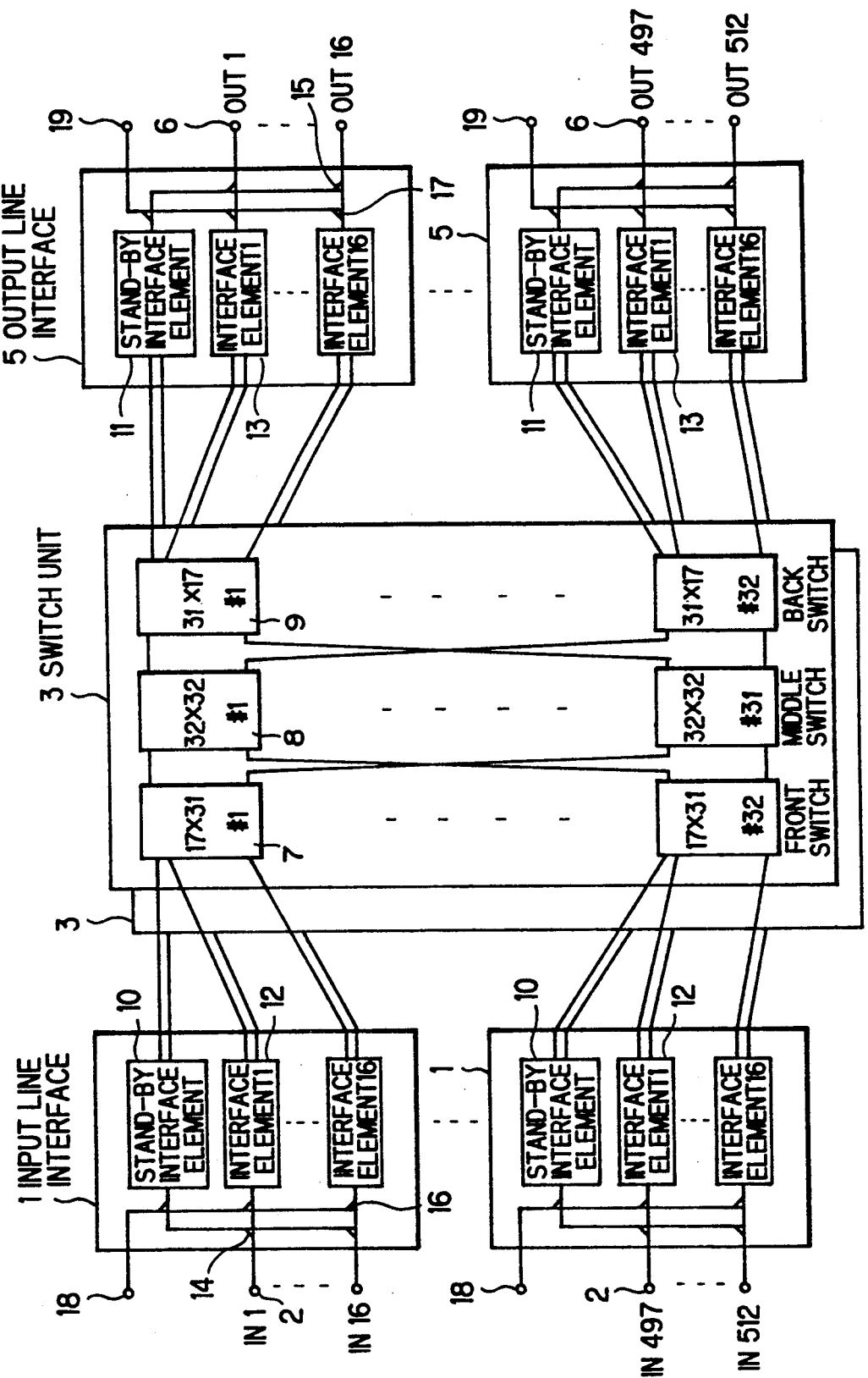
FIG. 1 is a block diagram showing a matrix switch apparatus similar to that proposed in the U.S. Ser. No. 235,442.

Before explaining a matrix switch apparatus with a diagnosis circuit in a preferred embodiment according to the invention, the matrix switch apparatus proposed in the aforementioned U.S. patent application will be explained in FIG. 1, wherein the matrix switch apparatus comprises thirty-two input line interface circuits 1s, two switch units 3s, and thirty-two output line interface circuits 5s. Each of the input line interface circuits 1s includes sixteen interface elements 12s, and a stand-by interface element 10. The sixteen interface elements 12s are connected through change-over switches 14s to sixteen input ports 2s, respectively. Each of the change-over switches 14s is changed-over by a control unit (not shown), such that a corresponding one of the input ports 2s is connected to the stand-by element 10, when the corresponding one breaks down. This provides one to sixteen redundancy structure in each input line interface circuit 1. The stand-by interface element 10 and the interface elements 12s are connected to change-over switches 16s, such that the stand-by interface element 10 is connected therethrough to a stand-by port 18 in the ordinary state, and the interface elements 12s are not connected thereby to the stand-by port 18, although each of the change-over switches 16s is changed over by the control unit, so that a corresponding one of the interface elements 12s is connected to the stand-by port 18. Such a change-over switch is explained in FIG. 3 in the aforementioned U.S. application.

Each of the two switch units 3s includes thirty-two front switches 7s, thirty-one middle switches 8s and thirty-two back switches 9s. Each of the thirty-two front switches 7s has seventeen input ports connected to the stand-by interface element 10 and the interface elements 12s of a corresponding one of the thirty-two input line interface circuits 1s, and thirty-one output ports each connected to a corresponding one of thirty-two input ports in each of the thirty-one middle switches 8s. Thirty-two output ports in each of the thirty-one middle switches 8s are connected to corresponding input ports of the thirty-two back switches 9s, and seventeen output ports in each of the back switches 9s are connected to a corresponding one of the thirty-two output line interface circuits 5s. Each of the thirty-two output line interface circuits 5s includes a stand-by interface element 11 and sixteen interface elements 13, which are connected through change-over switches 15s and 17s to a stand-by port 19 and output ports 6s in the same manner as explained in the input line interface circuits 1s.

Figure 2:
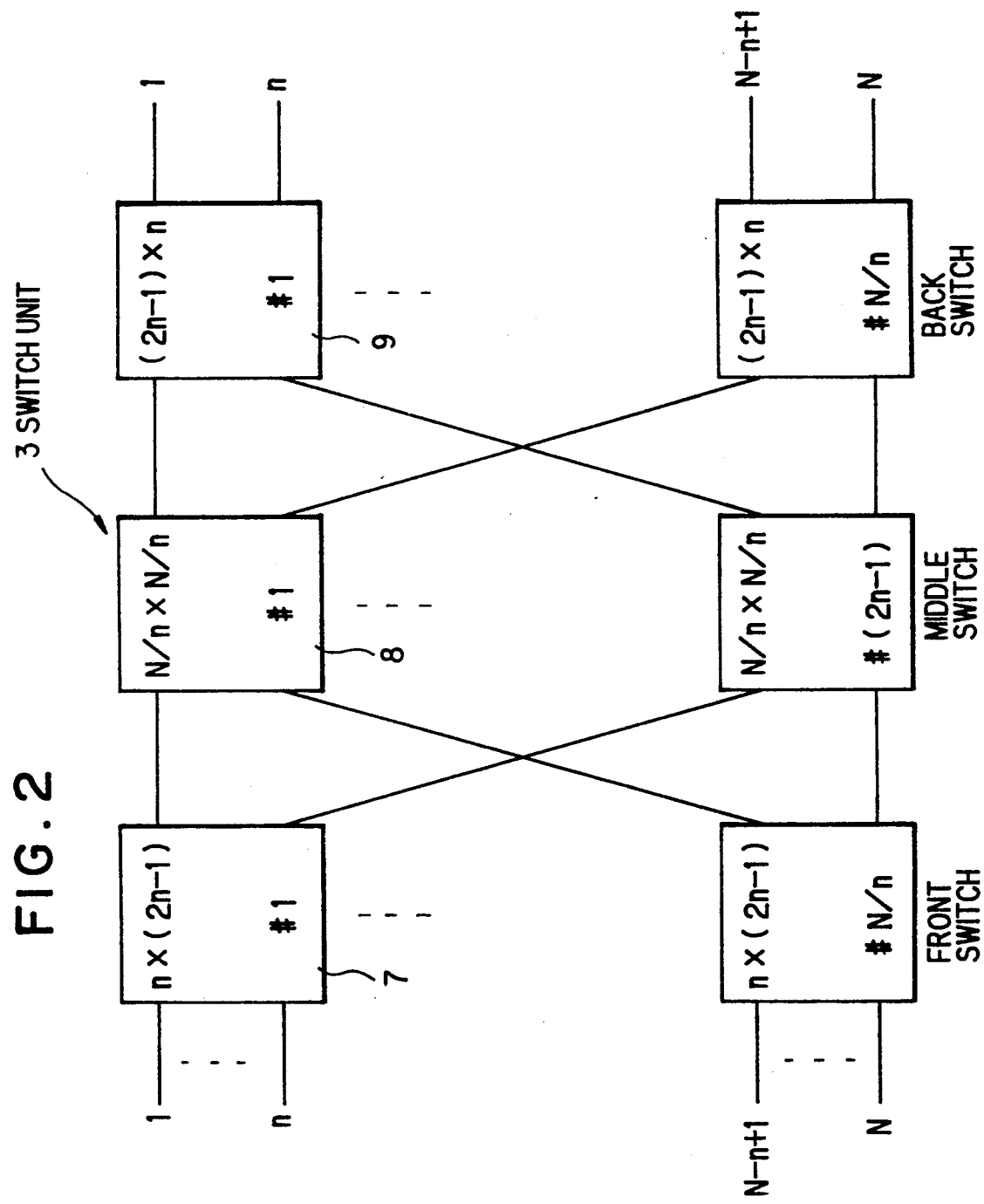
FIG. 2 and 3 are block diagrams explaining operation in the matrix switch apparatus in FIG. 1.

In FIG. 2, a switch unit 3 including front switches 7s of N/n (N and n are integers, N>n), middle switches 8s of (2n−1) and back switches 9s of N/n are shown to explain connecting paths for transmitting signals through the switch unit 3. In order that all signals supplied to input ports 1, 2 ... N of the front switches 7s are obtained at output ports 1, 2 ... N of the back switches 9s without any blocking of the signals, equations "n×(2n−1)", "N/n×N/n" and "2n−1)×n" must be met among the front, middle and back switches 7s, 8s and 9s as indicated in FIG. 2. Here, it is assumed that an input port of an $i_{th}$ front switch 7 (N/n≧i≧1) will be connected to an output port of an $j_{th}$ back switch 9 (N/n≧j≧1), where i and j are integers, and that (n−1) input ports of the $i_{th}$ front switch 7 and (n−1) output ports of the $j_{th}$ back switch 9 have been ever occupied for operation. It is further assumed that the (n−1) input ports have been connected to the middle switches 8s, respectively, different from the middle switches 8s connected by the (n−1) output ports. In this assumption, the number of the occupied middle switches 8s are calculated as belows.

$$(n-1)+(n-1)=2n-2$$

Therefore, one more middle switch 8 is necessary to be provided in the switch unit 3 to connect the input port of the $i_{th}$ front switch 7 to the output of the $j_{th}$ back switch 9 without any blocking of connecting paths. Then, the number of required middle switches 8s is, $$(2n-2)+1=2n-1$$

The calculated number "2n−1" in compliance with a specified number of the matrix switch apparatus as explained in FIG. 1.

Figure 3:
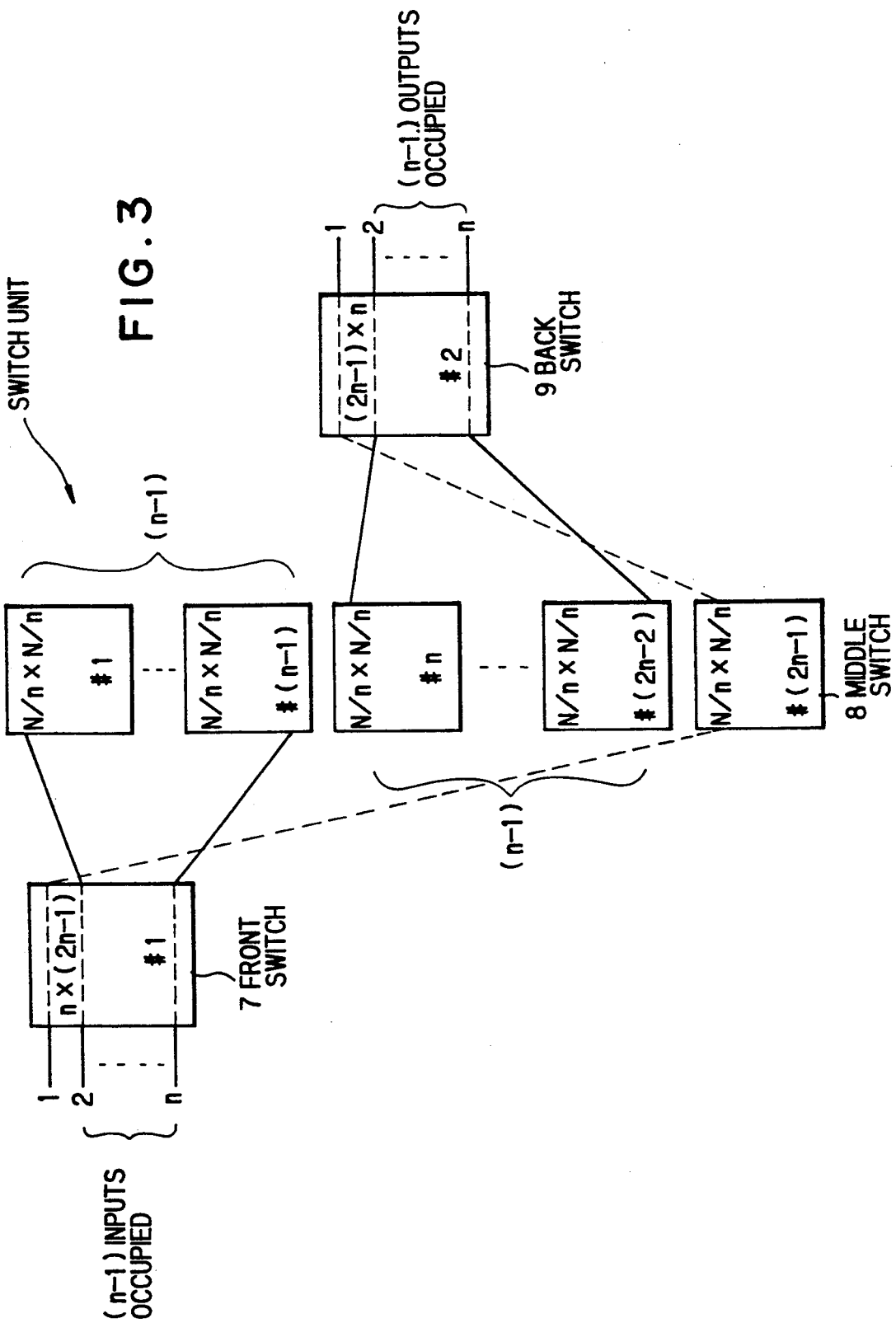

The above described calculation is shown in FIG. 3, wherein the $i_{th}$ front switch is the #1 front switch 7, and the $j_{th}$ back switch is the #2 back switch 9. The (n−1) input ports of the #1 front switch 7 are connected to the #1 to #(n−1) middle switches 8s, and the (n−1) output ports of the #2 back switch are connected to the #n to #(2n−2) middle switches 8s. Therefore, the #(2n−1) middle switch 8 must be provided to connect the first input port of the #1 front switch 7 to the first output of the #2 back switch as indicated by a dotted line.

As understood from FIGS. 1 to 3, however, a signal of the stand-by interface element 10 can not be transmitted through the switch unit 3 which is in the state of FIG. 3, since there is no middle switch for transmitting the signal. This is the disadvantage of the matrix switch apparatus proposed in the U.S. application, as described before. In order to overcome this disadvantage, it is considered that a non-blocking structure is provided for both stand-by ports and working input and output ports. In such a case, a front switch must be provided with seventeen input ports and thirty-three output ports, a middle switch must be provided with thirty-two input ports and thirty-two output ports, and a back switch must be provided with thirty-three input ports and seventeen output ports. Particularly, thirty-three middle switches must be provided in a switch unit. As a result, the number of ports and switch elements is increased.

Figure 4:
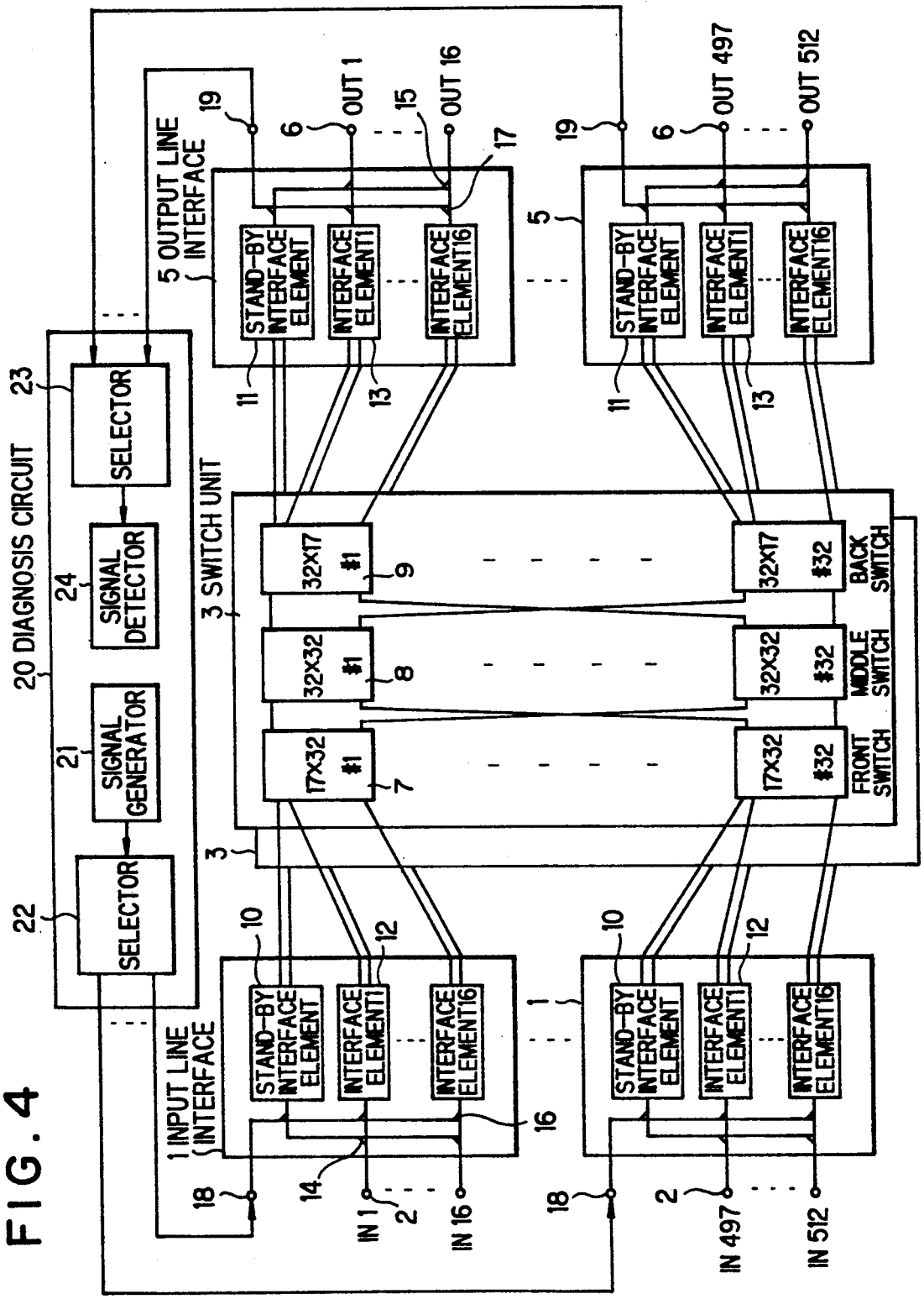
FIG. 4 is a block diagram showing a matrix switch apparatus with a diagnosis circuit in a preferred embodiment according to the invention.

Next, a matrix switch apparatus with a diagnosis circuit in the preferred embodiment according to the invention will be explained in FIG. 4, wherein like parts are indicated by like reference numerals, except that each of the front switches 7s is provided with seventeen input ports and thirty-two output ports, each of the back switches 9s is provided with thirty-two input ports and seventeen output ports, and the number of the middle switches 8s is thirty-two. In addition, a diagnosis circuit 20 is shown, which includes a diagnosis signal generator 21 for generating a diagnosis signal, a selector 22 for supplying the diagnosis signal to one of the stand-by ports 18s of the input line interface circuits 1s, a selector 23 for receiving the diagnosis signal from one of the stand-by ports 19s of the output line interface circuits 5s, and a diagnosis signal detector 24 for detecting the diagnosis signal supplied from the selector 23.

Figure 5:
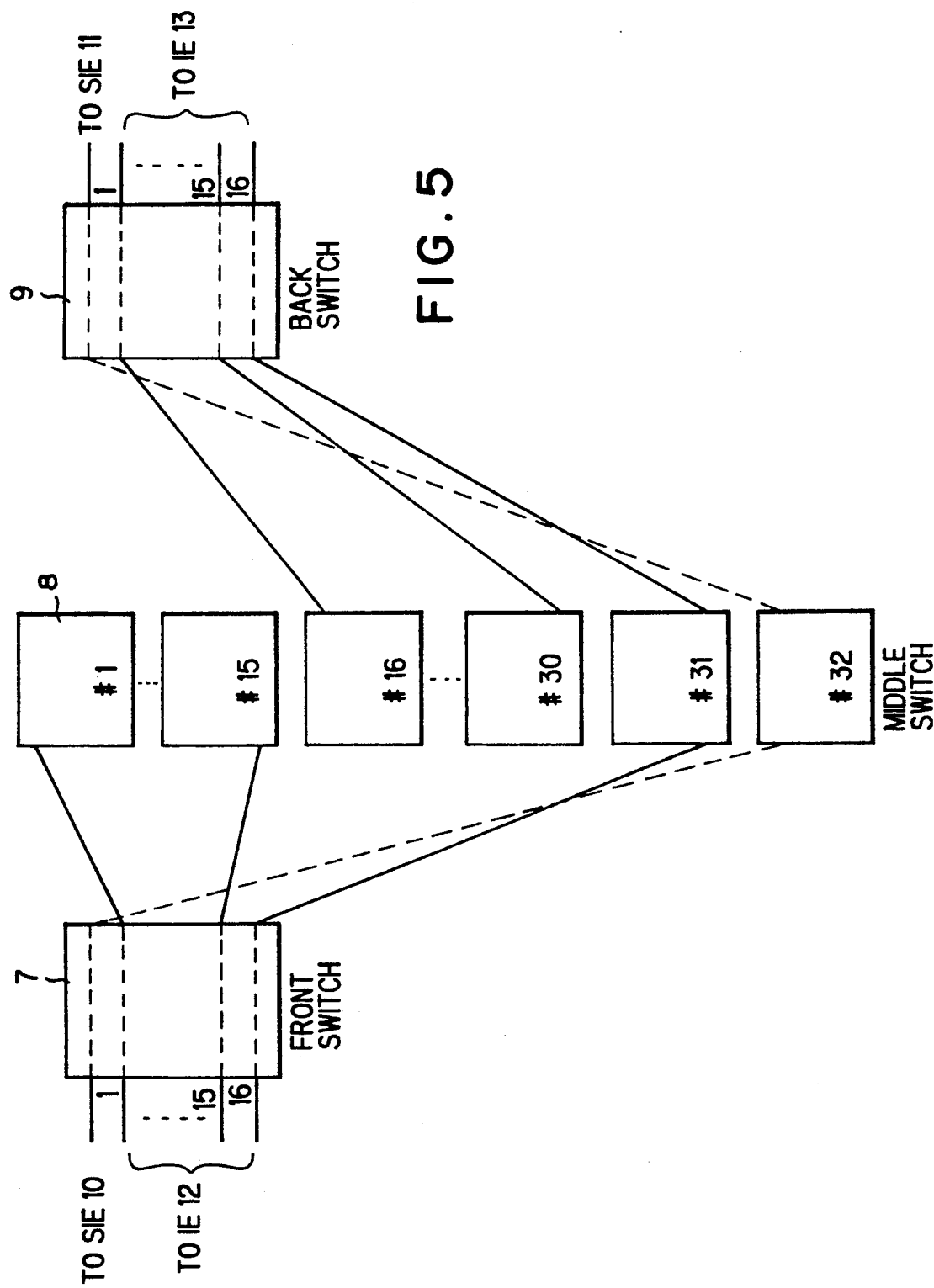
FIG. 5 is a block diagram explaining operation in the matrix switch apparatus in FIG. 4.

In operation, the sixteen input ports of a front switch 7 are connected to the middle switches 8s (#1 to #15 and #31), and the sixteen output ports of a back switch 9 are connected to the middle switches 8s (#16 to #31), as shown in FIG. 5. In such a circumstance, the diagnosis signal is generated from the diagnosis signal generator 21, and supplied through the selector 22 to the stand-by port 18 connected to the stand-by interface element 10 in an input line interface circuits 1 corresponding to the front switch 7. Then, the diagnosis signal is transmitted from the front switch 7 to the middle switch 8 (#32), and therefrom to the back switch 9, as indicated by a dotted line. Thereafter, the diagnosis signal is supplied to the stand-by interface element 11 in an output line interface circuit 1 corresponding to the back switch 9, and from the stand-by port 19 to the selector 23. Thus, the diagnosis signal supplied from the selector 23 is detected by the diagnosis signal detector 24.

Although the diagnosis of the stand-by ports 18 and 19 is carried out in the preferred embodiment, the working input and output ports which become nonoccupied can be diagnosed by receiving the diagnosis signal from the selector 22 and supplying the diagnosis signal to the selector 23 in accordance with the switching of the change-over switches 16 and 17. Further, the number of ports and switches may be changed in the switch unit 3.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A matrix switch apparatus with a diagnosis circuit, comprising:
   a predetermined number N of input line interface circuits each including a stand-by interface element and interface elements of M in number to provide a 1:M redundancy structure, where M and N are integers;
   a plurality of output line interface circuits each including a stand-by interface element and interface elements of M in number to provide a 1:M redundancy structure;
   a switch unit including front switches, middle switches, and back switches, respectively, arranged in rows to be positioned between said input line interface circuits and said output line interface circuits;
   a plurality of N stand-by input ports corresponding to said N input line interface circuits, each stand-by input port connected to said stand-by interface element of said corresponding input lie interface circuit;
   a plurality of N stand-by output ports corresponding to said N output line interface circuits, each stand-by output port connected to said stand-by interface element of said corresponding output line interface circuit;
   a diagnosis circuit for supplying a diagnosis signal to said stand-by interface elements in said input lien interface circuits and receiving said diagnosis signal from said stand-by interface elements in said output line interface circuits to diagnose said input and output stand-by ports;
   wherein the number of said front and back switches is equal to said predetermined number N, respectively, each of said front and back switches is provided with input and output ports having a ratio defined by (M+1) and 2M, and the number of said middle switches is 2M, each of said middle switches being provided with input and output ports, respectively, equal in number to 2M.

2. A matrix switch apparatus with a diagnosis circuit, according to claim 1, wherein:
   said stand-by interface element and said interface elements in each of said input and output interface circuits are connected through change-over switches to said stand-by port, whereby said diagnosis circuit is connected to one interface element selected from from group of said stand-by interface element and said interface elements.

3. An apparatus as claimed in claim 1, wherein N is equal to 32 and M is equal to 16.

4. An apparatus for diagnosing a matrix switch in a stand-by interface circuit, comprising:
   thirty-two input line interface circuits; two switch units; and
   thirty-two output line interface circuits, wherein each of the input line interface circuits includes sixteen interface elements, and a stand-by interface element, the sixteen interface elements being connected through a plurality of change-over switches to sixteen input ports, each of the change-over switches changes-over such that whenever the corresponding one of the interface elements breaks down, a corresponding one of the input ports connects to the stand-by interface element, and the stand-by interface element and the interface elements being connected to the change-over switches, the stand-by interface element being connected therethrough to one of the stand-by port in an ordinary state, the interface elements being disconnected from the stand-by ports, and each of the change-over switches being changed over such that a corresponding one of the interface elements is connected to one of the stand-by ports, and
   each of said switch units further comprising:
      a front switch having seventeen input ports and thirty-two output ports;
      a middle switch having thirty-two input ports and thirty-two output ports;
      a back switch having thirty-two input ports and seventeen output ports; and
      a diagnosis circuit, said diagnosis circuit includes:
         a diagnosis signal generator for generating a diagnosis signal,
         a first selector for supplying the diagnosis signal to one of the stand-by ports of the input lie interface circuits,
         a second selector for receiving the diagnosis signal from one of the stand-by ports of the output line interface circuits, and
         a diagnosis signal detector for detecting the diagnosis signal supplied from the second selector,
      said sixteen input ports of the front switch being connected to the middle switch, the sixteen output ports of a back switch being connected to the middle switch, and the diagnosis signal being generated from the diagnosis signal generator and being supplied through the first selector to the stand-by port connected to the stand-by interface elements in one of the input line interface circuits corresponding to the front switch such that the diagnosis signal is transmitted from the front switch to the middle switch, and therefrom to the back switch and supplied to the stand-by interface element in one of the output line interface circuits corresponding to the back switch, and further supplied from the stand-by ports to the second selector and detected by the diagnosis signal detector.

* * * * *